Patented Mar. 25, 1952

2,590,449

UNITED STATES PATENT OFFICE 2,590,449

CATION EXCHANGE RESINS

Julian A. Otto, Long Island City, N. Y., assignor to Allied Chemical & Dye Corporation, New York, N. Y., a corporation of New York No Drawing. Application June 8, 1949, Serial No. 97,915

24 Claims. (Cl. 210—24)

This invention relates to certain improved organic resins and more particularly is concerned with water-insoluble cation exchange resins possessing the property of exchanging hydrogen ions for metallic ions, the preparation of such resins and the achievement of cation exchange therewith.

Ion exchange processes utilizing organic resins have recently assumed increasing commercial importance. Thus, cation exchange resins are at present being successfully employed to a great extent not only for water softening and purification but also in the purification of gases and inorganic and organic solutions of chemicals such as carbohydrates, e. g. beet sugar juices. Other recent applications of cation exchange resins include their utilization as catalysts for organic reactions such as esterification, and their employment in the preparation of inorganic salts, bases and acids, in the cultivation of plants and in the making of stable sols.

I am aware that cation exchange resins have been prepared by reacting phenol sulfonic acids with aldehydes such as formaldehyde. It is further known that cation exchange resins have been produced by reacting a phenol first with a relatively small amount of acetaldehyde disulfonic acid to form a water soluble resin and then reacting such resin with a major proportion of formaldehyde to form the final insoluble product.

One object of the invention is the production of certain improved organic resins. Another object is the production of water-insoluble cation exchange resins containing a high content of sulfonate groups and having high cation absorption and swelling capacity. Another object of the invention is to provide processes for the preparation of such resins. A further aim of the invention is the provision of processes for treating fluids by means of the resins of the invention. Other objects and advantages of the invention will be apparent from the following detailed description thereof.

In accordance with the invention, I have found that excellent water-insoluble cation exchange resins of high cation absorption capacity may be prepared by condensation of a soluble acetaldehyde disulfonate or a soluble monochloroacetaldehyde disulfonate, with a phenol hereinafter defined, in the presence of an acid condensing agent, about 2¾ to 3, preferably 2.9 to 3, mols of the aldehyde disulfonate being condensed per 2 mols of the phenol. The valuable properties as cation exchange agents of the resins thus produced are believed to be attributable primarily to their high content of sulfonate groups and also to the fact that the sulfonate groups in the resin are linked to the aliphatic aldehyde residue rather than to the aromatic phenol nucleus. Thus, for example, a resin produced by condensing about 3 mols of an acetaldehyde disulfonate compound with 2 mols of a phenol, in accordance with the principles of the invention, contains sulfonate groups on the three aliphatic aldehyde residues rather than on the aromatic nuclei, of which there are only two in the resin.

As phenols suitable for the purposes of the invention are those containing from 1 to 3 nuclear hydroxyl groups, the hydroxyl groups occupying the 1-, 3- and 5-positions in the aromatic nucleus when there are 3 such groups present, the phenol being otherwise unsubstituted. Specific illustrations of the phenols which may accordingly be employed are phenol, resorcinol, catechol, hydroquinone and phloroglucinol. Mixtures of such phenols may also be utilized.

The soluble acetaldehyde disulfonates and monochloroacetaldehyde disulfonates utilized for reaction with the above phenols include the free acids acetaldehyde disulfonic acid

$(HSO_3)_2CH—CHO$ and monochloroacetaldehyde disulfonic acid $(HSO_3)_2CCl—CHO$ and the alkali metal salts of such acids, e. g. the potassium and sodium salts, particularly the potassium salt. The acetaldehyde disulfonates may be applied in hydrated form. Also, mixtures of acetaldehyde disulfonic acid with its monochloro derivative may be employed, as well as mixtures of such free acids with the alkali metal salts thereof and mixtures of the various alkali metal salts of the acids.

Although the acetaldehyde disulfonate compounds utilized as starting materials in the invention may be prepared in any known manner, I have found it convenient to prepare acetaldehyde disulfonic acid by reacting acetylene with oleum (of at least 45% free $SO_3$ content) in a ratio of about 1 mol of acetylene to every 4 mols of the free $SO_3$ content of the oleum, and then, by addition of water, hydrolyzing the oleumacetylene reaction mixture thus formed to produce a mixture containing acetaldehyde disulfonic acid and sulfuric acid, as described in Otto and Gilbert U. S. Patent 2,552,421 issued May 8, 1951. The crude reaction mixture of hydrolysis containing sulfuric acid, may then be employed directly for reaction with the above phenols in accordance with the invention, the sulfuric acid present functioning as the acid condensing agent. The monochloroacetaldehyde disulfonic acid may be prepared by chlorinating the above hydrolyzed oleum-acetylene reaction mixture containing sulfuric acid, and the crude chlorinated product also may be utilized directly for condensation with a phenol. The term "oleum-acetylene reaction mixture" noted hereinafter is intended to denote reaction mixtures prepared by passing acetylene into oleum in the above specified proportions.

In the preferred manner of preparing a cation exchange resin in accordance with practice of the invention, the phenol, preferably phenol itself, is admixed with the acetaldehyde disulfonate compound, e. g. potassium acetaldehyde disulfonate, in a ratio of about 3 mols of the acetaldehyde disulfonate to about 2 mols of the phenol, and the mixture is heated at elevated temperature for a sufficient period of time to effect reaction between the acetaldehyde disulfonate and phenol to form a solid water-insoluble resin. The reaction is carried out in the presence of an acid condensing agent such as hydrochloric, sulfuric or phosphoric acid. A considerable amount of such acid condensing agent is employed, usually substantially in excess of the molecular equivalent of acetaldehyde disulfonate present. Temperature of reaction is not critical, but may be maintained sufficiently high to cause rapid reaction without decomposition of the resin formed. Reaction temperature may, for example, vary from about 60 to 150° C., but preferably is within the range of about 80-125° C. Time of reaction may also vary considerably depending for example, upon the temperature employed.

The resin produced in the above reaction may then be dried by subjecting it preferably to a temperature ranging from 65 to 105° C. Drying temperatures above about 110° C. should be avoided as such higher temperatures tend to produce an inferior type resin.

The resins produced in accordance with the invention are generally reddish brown to black in color and when dry are hard and brittle and may be broken into small pieces either by grinding or by introducing the dry material into water. The resins are insoluble in water, but the dry products absorb water very readily, resulting in swelling to the extent that the hydrated resin may occupy several times the volume of the dry resin, the hydrated material being much softer than the dry product. The ability of the resins of the invention to swell so greatly is believed due to the high sulfonate group content of the resin product, which, as previously noted, results in the provision of an efficient cation exchange material of high absorption capacity. The phenol-acetaldehyde disulfonate resins of the invention may contain up to about 20% of sulfur as sulfonate.

The following detailed examples are illustrative of the invention, all quantities being expressed in parts by weight:

*Example 1.*—About 60 parts of potassium acetaldehyde disulfonate monohydrate and 13 parts of phenol, constituting a ratio of about 3 mols of the acetaldehyde disulfonate compound to 2 mols of phenol, were mixed in a pressure vessel with 300 parts of constant boiling (20%) hydrochloric acid and the mixture was heated for 5 hours at 130–135° C. with intermittent agitation. The mixture gradually solidified to a gelatinous mass which was then dried over a steam bath. The dried resin when placed in water broke into small pieces and was washed free of inorganic salts with water. The resulting product contained about 16% sulfur as sulfonate on a dry basis and when completely hydrated swelled to about twice the volume of the dry resin. In the hydrated state the resin contained about 64 grams of sulfur as sulfonate groups per liter of resin material, thus indicating good cation-exchange properties.

*Example 2.*—About 89 parts of potassium acetaldehyde disulfonate monohydrate and 19 parts of phenol were mixed with 300 parts of 60% sulfuric acid and the reaction mixture heated at 90–100° C. for 2 hours in a closed vessel with intermittent shaking. The resin thus formed was broken up and washed with water until the wash water from the resin no longer contained sulfate ion. On drying to constant weight at 90–95° C., the resin was found to contain about 18% sulfur as sulfonate. A 10 gram portion of the resin, which when dry occupied a volume of 10 cc., expanded to 58 cc. when placed in water and allowed to hydrate.

A 10 cc. volume of resin prepared under similar conditions but dried at 110° C. expanded on hydration to 37 cc.

*Example 3.*—About 30 parts of potassium acetaldehyde disulfonate monohydrate, 7 parts of resorcinol and 200 parts of 60% sulfuric acid were mixed in a closed vessel and the mixture was heated at 85–90° C. on a steam bath with efficient agitation for one hour. The resin formed was broken up and washed in the manner noted in Example 2. The molar ratio of acetaldehyde disulfonate compound to resorcinol utilized in the reaction was about 3 to 2. After washing, the resin was dried in an oven at 100–105° C. The sulfur content as sulfonate of the resin was about 18% and when placed in water, 10 cc. of the dried resin weighing 10.8 grams expanded to 33 cc.

*Example 4.*—To 444 parts of a solution containing about 15% by weight of acetaldehyde disulfonic acid and 40% $H_2SO_4$, obtained by hydrolysis of an oleum-acetylene reaction mixture, was added about 19 parts of phenol, the acetaldehyde disulfonic acid to phenol mol ratio being about 3 to 2. The resulting mixture was heated in a closed receptacle at 85–100° C. for about 2 hours with intermittent agitation. The resin formed was broken up, washed as in Example 2, and dried at 105° C. The resin, on analysis, contained about 20% sulfur in the form of sulfonate groups. A 10 cc. portion of the dry resin weighed 9.4 grams and when placed in water, underwent vigorous decrepitation, expanding to 23 cc.

*Example 5.*—About 33 parts of potassium monochloroacetaldehyde disulfonate monohydrate, 6 parts of phenol and 100 parts of 20% hydrochloric acid, were mixed and heated at 100° C. in a pressure vessel, with intermittent shaking, for 48 hours. The mol ratio of chlorinated acetaldehyde disulfonate compound to phenol was about 3 to 2. The soft gelatinous mass which formed was dried over a steam bath and the dry resinous product mixed with inorganic salts was broken up and washed with water until the eluate from the resin bed was free of chloride and sulfate ions. The resin was then dried at 105° C. On analysis, the resin contained about 12% sulfur as sulfonate and 13% chlorine. When placed in water, the resin expanded to about twice the volume occupied by the dry material.

*Example 6.*—444 parts of the product of hydrolysis of an oleum-acetylene reaction mixture, containing 15% by weight acetaldehyde disulfonic acid and about 40% $H_2SO_4$, was saturated with chlorine. After removing unreacted chlorine by heating at 85° C., about 19 parts of phenol were added to the chlorinated mixture, the mol ratio of chlorinated acetaldehyde disulfonic acid to phenol present being about 3 to 2. The resulting mixture was heated in a closed vessel at 100° C. for 17½ hours, after which the resin formed was broken up and washed free of sulfate and chloride ions and then dried in an oven at 105° C. The dry resin contained about 13% sulfur and 14% chlorine. On contact with water, 10 cc. of the resin, weighing 9.0 grams, expanded to 21 cc. with vigorous decrepitation.

Example 7.—A batch of resin was prepared by reacting potassium acetaldehyde disulfonate with phenol as described in Example 1, and the resin dried for the most part over a steam bath and finally in an oven at 70° C. The dried resin was comminuted in a crusher and particles between 18 and 40 mesh were separately collected. This portion of resin was treated with an excess of sodium hydroxide solution and then washed with water until the eluate from the resin bed was almost neutral, the resin being thereafter dried in an oven at 70° C. When used for water softening purposes, one cubic foot of the resin absorbed about 33,000 grains of calcium hardness, calculated as CaCO₃, as compared to a hardness absorption capacity of 18,000 to 20,000 grains per cubic foot for a proprietary sulfonated phenol-formaldehyde cation exchange resin.

Example 8.—About 30 parts of potassium acetaldehyde disulfonate, 7 parts of catechol and 100 parts of 20% hydrochloric acid were mixed and heated at 120–125° C. in a pressure vessel for about 5 hours, the mol ratio of disulfonate compound to catechol employed being about 3 to 2. The reaction mixture was then transferred to a reaction vessel maintained at normal pressure and the contents evaporated to dryness on a steam bath for a period of 72 hours. A water-insoluble resin was produced which swelled greatly on contact with water.

Example 9.—The same procedure as in Example 8 was followed using hydroquinone in place of catechol. The product obtained was a water-insoluble resin which swelled greatly when placed in water.

Example 10.—About 30 parts of potassium acetaldehyde disulfonate, 8 parts of phloroglucinol and 100 parts of 20% hydrochloric acid were mixed and heated in a pressure vessel at 120–125° C. for about 5 hours. The resin formed was then transferred to an evaporating dish and heated for one hour on a steam bath. The resulting product was then washed and dried in an oven at 95–100° C. to constant weight to produce a water-insoluble resin.

Since it is apparent to those skilled in the art that various changes and modifications may be made in the invention wtihout departing from the spirit thereof, the invention is to be taken as limited only by the scope of the appended claims.

I claim:

1. A water-insoluble cation exchange resin obtained by condensation of a substance selected from the group consisting of acetaldehyde disulfonic acid, monochloroacetaldehyde disulfonic acid and the alkali metal salts thereof, with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2¾ to 3 mols of the aldehyde compound being condensed per 2 mols of said phenol.

2. A water-insoluble cation exchange resin obtained by condensation of a substance selected from the group consisting of acetaldehyde disulfonic acid, monochloroacetaldehyde disulfonic acid and the alkali metal salts thereof, with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2.9 to 3 mols of the aldehyde compound being condensed per 2 mols of said phenol.

3. A water-insoluble cation exchange resin obtained by condensation of an alkali metal acetaldehyde disulfonate with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2¾ to 3 mols of the aldehyde disulfonate being condensed per 2 mols of said phenol.

4. A water-insoluble cation exchange resin obtained by condensation of an alkali metal monochloroacetaldehyde disulfonate with a phenol, in the presence of an acid condensing agent, said phenol containing from 1 to 3 nuclear hydroxyl groups, the hydroxyl groups occupying the 1-, 3- and 5-positions in the aromatic nucleus when there are three such groups present, said phenol being otherwise unsubstituted, 2¾ to 3 mols of the aldehyde disulfonate being condensed per 2 mols of said phenol.

5. A water-insoluble cation exchange resin obtained by heating a substance selected from the group consisting of acetaldehyde disulfonic acid, monochloroacetaldehyde disulfonic acid and the alkali metal salts thereof, with phenol at a temperature of 60°–150° C. and in the presence of an acid condensing agent, 2¾ to 3 mols of the aldehyde compound being employed per 2 mols of phenol.

6. A water-insoluble cation exchange resin obtained by heating a substance selected from the group consisting of acetaldehyde disulfonic acid, monochloroacetaldehyde disulfonic acid and the alkali metal salts thereof, with resorcinol, at a temperature of 60°–150° C. and in the presence of an acid condensing agent, 2¾ to 3 mols of the aldehyde compound being employed per 2 mols of resorcinol.

7. A water-insoluble cation exchange resin obtained by heating an alkali metal acetaldehyde disulfonate with phenol at a temperature of 60°–150° C. and in the presence of an acid condensing agent, 2¾ to 3 mols of the aldehyde disulfonate being employed per 2 mols of phenol.

8. A water-insoluble cation exchange resin obtained by heating an alkali metal acetaldehyde disulfonate with resorcinol, at a temperature of 60°–150° C. and in the presence of an acid condensing agent, 2¾ to 3 mols of the aldehyde disulfonate being employed per 2 mols of resorcinol.

9. A water-insoluble cation exchange resin obtained by heating acetaldehyde disulfonic acid with phenol at a temperature of 60°–150° C. and in the presence of an acid condensing agent, 2.9 to 3 mols of said disulfonic acid being employed per 2 mols of phenol, and drying the resin formed at a temperature not exceeding 110° C.

10. A water-insoluble cation exchange resin obtained by heating potassium acetaldehyde disulfonate with phenol, at a temperature of 60°–150° C. and in the presence of an acid condensing agent, 2.9 to 3 mols of the aldehyde disulfonate being employed per 2 mols of phenol, and drying the resin at a temperature not exceeding 110° C.

11. A water-insoluble cation exchange resin obtained by heating an alkali metal monochloroacetaldehyde disulfonate with phenol, at a temperature of 60°–150° C. and in the presence of an acid condensing agent, 2¾ to 3 mols of the aldehyde disulfonate being employed per 2 mols of phenol.

12. A water-insoluble cation exchange resin obtained by heating monochloroacetaldehyde disulfonic acid with phenol, at a temperature of 60°–150° C. and in the presence of an acid condensing agent, 2.9 to 3 mols of said disulfonic acid being employed per 2 mols of phenol.

13. The method of preparing a water-insoluble cation exchange resin which comprises condensing a substance selected from the group consisting of acetaldehyde disulfonic acid, monochloroacetaldehyde disulfonic acid and the alkali metal salts thereof, with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2¾ to 3 mols of the aldehyde compound being condensed per 2 mols of said phenol.

14. The method of preparing a water-insoluble cation exchange resin which comprises condensing an alkali metal acetaldehyde disulfonate with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2¾ to 3 mols of the aldehyde disulfonate being condensed per 2 mols of said phenol.

15. The method of preparing a water-insoluble cation exchange resin which comprises condensing an alkali metal monochloroacetaldehyde disulfonate with a phenol, in the presence of an acid condensing agent, said phenol containing from 1 to 3 nuclear hydroxyl groups, the hydroxyl groups occupying the 1-, 3- and 5-positions in the aromatic nucleus when there are 3 such groups present, said phenol being otherwise unsubstituted, 2¾ to 3 mols of the aldehyde disulfonate being condensed per 2 mols of said phenol.

16. The method of preparing a water-insoluble cation exchange resin which comprises heating a substance selected from the group consisting of acetaldehyde disulfonic acid, monochloroacetaldehyde disulfonic acid and the alkali metal salts thereof, with phenol, at a temperature of 60°–150° C. and in the presence of an acid condensing agent, 2¾ to 3 mols of the aldehyde compound being employed per 2 mols of phenol.

17. The method of preparing a water-insoluble cation exchange resin which comprises heating a substance selected from the group consisting of acetaldehyde disulfonic acid, monochloroacetaldehyde disulfonic acid and the alkali metal salts thereof, with resorcinol, at a temperature of 60°–150° C. and in the presence of an acid condensing agent, 2¾ to 3 mols of the aldehyde compound being employed per 2 mols of resorcinol.

18. The method of preparing a water-insoluble cation exchange resin which comprises heating an alkali metal acetaldehyde disulfonate with phenol, at a temperature of 60°–150° C. and in the presence of an acid condensing agent, 2¾ to 3 mols of the aldehyde disulfonate being employed per 2 mols of phenol, and drying the resin formed at a temperature not exceeding 110° C.

19. The method of preparing a water-insoluble cation exchange resin which comprises hydrolyzing with water an oleum-acetylene reaction mixture, heating the resulting reaction mixture containing acetaldehyde disulfonic acid, with phenol in a ratio of 2.9 to 3 mols of the disulfonic acid to 2 mols of phenol, at a temperature of 60°–150° C. and in the presence of sulfuric acid contained in said hydrolyzed oleum-acetylene reaction mixture.

20. The method of preparing a water-insoluble cation exchange resin which comprises heating an alkali metal monochloroacetaldehyde disulfonate with phenol, at a temperature of 60°–150° C. and in the presence of an acid condensing agent, 2¾ to 3 mols of the aldehyde disulfonate being employed per 2 mols of phenol.

21. The method of treating fluids for removal of cation therefrom which comprises subjecting the fluid to the action of a water-insoluble resin as defined in claim 1.

22. The method of treating fluids for removal of cation therefrom which comprises subjecting the fluid to the action of a water-insoluble resin prepared by heating an alkali metal acetaldehyde disulfonate with phenol at a temperature of 60°–150° C. and in the presence of an acid condensing agent, 2¾ to 3 mols of the aldehyde disulfonate being employed per 2 mols of phenol.

23. The method of treating fluids for removal of cation therefrom which comprises subjecting the fluid to the action of a water-insoluble resin prepared by heating an alkali metal monochloroacetaldehyde disulfonate with phenol at a temperature of 60°–150° C. and in the presence of an acid condensing agent, 2¾ to 3 mols of the aldehyde disulfonate being employed per 2 mols of phenol.

24. The method of treating fluids for removal of cation therefrom which comprises subjecting the fluid to the action of a water-insoluble resin prepared by heating potassium acetaldehyde disulfonate with phenol at a temperature of 60°–150° C. and in the presence of an acid condensing agent, 2.9 to 3 mols of said disulfonate being employed per 2 mols of phenol.

JULIAN A. OTTO.

REFERENCES CITED

The following references are of record in the file of this patent:

UNITED STATES PATENTS

| Number | Name | Date |
| --- | --- | --- |
| 2,319,359 | Wassenegger | May 18, 1943 |

FOREIGN PATENTS

| Number | Country | Date |
| --- | --- | --- |
| 383,189 | Germany | Oct. 11, 1923 |